(12) United States Patent
Cowdery-Corvan et al.

(10) Patent No.: US 8,980,202 B2
(45) Date of Patent: Mar. 17, 2015

(54) CERIUM CONTAINING NANOPARTICLES PREPARED IN NON-POLAR SOLVENT

(76) Inventors: Peter Jerome Cowdery-Corvan, Webster, NY (US); Lyn Marie Irving, Penfield, NY (US); Richard Kenneth Hailstone, North Chili, NY (US); Kenneth Joseph Reed, Brighton, NY (US); Thomas Dale Allston, Lima, NY (US); Carly Louise Augustyn, Spencerport, NY (US)

(*) Notice: Subject to any disclaimer, the term of this patent is extended or adjusted under 35 U.S.C. 154(b) by 0 days.

(21) Appl. No.: 13/295,382

(22) Filed: Nov. 14, 2011

(65) Prior Publication Data

US 2012/0117863 A1 May 17, 2012

Related U.S. Application Data

(60) Provisional application No. 61/412,826, filed on Nov. 12, 2010.

(51) Int. Cl.
*C01F 17/00* (2006.01)
*B82Y 30/00* (2011.01)
*C01G 25/00* (2006.01)
*C01G 49/00* (2006.01)

(52) U.S. Cl.
CPC .......... *C01F 17/0043* (2013.01); *B82Y 30/00* (2013.01); *C01F 17/0018* (2013.01); *C01G 25/00* (2013.01); *C01G 49/0054* (2013.01); *C01P 2002/54* (2013.01); *C01P 2002/72* (2013.01); *C01P 2004/04* (2013.01); *C01P 2004/64* (2013.01)
USPC .......... 423/21.1; 423/263; 423/275; 516/33

(58) Field of Classification Search
USPC .................. 423/263, 275; 502/304
See application file for complete search history.

(56) References Cited

U.S. PATENT DOCUMENTS

| | | | | |
|---|---|---|---|---|
| 2003/0224931 | A1* | 12/2003 | Yamamoto et al. | 502/304 |
| 2008/0161213 | A1* | 7/2008 | Jao et al. | 508/165 |
| 2010/0152077 | A1 | 6/2010 | Allston et al. | |
| 2010/0242342 | A1 | 9/2010 | Reed et al. | |

FOREIGN PATENT DOCUMENTS

| | | | |
|---|---|---|---|
| WO | WO 2006/073416 A1 | | 7/2006 |
| WO | 2008/030805 | * | 3/2008 |
| WO | 2010/071641 | * | 6/2010 |

OTHER PUBLICATIONS

International Search Report & Written Opinion issued Nov. 14, 2011 in corresponding PCT/US2011/060562.
Gu, Hua et al. "Preparation and Characterization of Monodisperse Cerium Oxide," *Chemistry of Materials*, 19(5) pp. 1103-1110 (2007).

* cited by examiner

*Primary Examiner* — Steven Bos
(74) *Attorney, Agent, or Firm* — RatnerPrestia

(57) ABSTRACT

A method of making cerium-containing metal oxide nanoparticles in non-polar solvent eliminates the need for solvent shifting steps. The direct synthesis method involves: (a) forming a reaction mixture of a source of cerous ion and a carboxylic acid, and optionally, a hydrocarbon solvent; and optionally further comprises a non-cerous metal ion; (b) heating the reaction mixture to oxidize cerous ion to ceric ion; and (c) recovering a nanoparticle of either cerium oxide or a mixed metal oxide comprising cerium. The cerium-containing oxide nanoparticles thus obtained have cubic fluorite crystal structure and a geometric diameter in the range of about 1 nanometer to about 20 nanometers. Dispersions of cerium-containing oxide nanoparticles prepared by this method can be used as a component of a fuel or lubricant additive.

21 Claims, 10 Drawing Sheets

Electron Diffraction of Cerium Containing Nanoparticles

X-ray Diffraction Pattern of Ceria Nanoparticles

Electron Diffraction of Ceria Containing Nanoparticles

Cerium Containing Nanoparticles Prepared in Oleic Acid and ISOPAR™-G Solvent

Cerium Containing Nanoparticles Prepared in Oleic Acid and ISOPAR™-G Solvent

Cerium Containing Nanoparticles Prepared in Oleic Acid and ISOPAR™-G Solvent

Cerium Containing Nanoparticles Prepared in Oleic Acid and 1-Octadecene Solvent

Cerium Containing Nanoparticles Prepared in Oleic Acid and 1-Octadecene Solvent

Cerium and Iron Containing Nanoparticles Prepared in Oleic Acid and
1-Octadecene Solvent Cerium and Iron Containing Nanoparticles Prepared in Oleic Acid and 1-Octadecene Solvent

CERIUM CONTAINING NANOPARTICLES PREPARED IN NON-POLAR SOLVENT

CROSS-REFERENCE TO RELATED APPLICATIONS

This application claims the benefit of priority to Provisional Application Ser. No. 61/412,826, CERIUM CONTAINING NANOPARTICLES PREPARED IN NON-POLAR SOLVENT, filed Nov. 12, 2010, the disclosure of which is incorporated herein by reference in its entirety.

FIELD OF THE INVENTION

The present invention relates in general to processes for preparing nanoparticles. In particular embodiments the invention relates to cerium-containing nanoparticles dispersed in non-polar media, which are useful, for example, as components of fuel additives.

BACKGROUND OF THE INVENTION

Cerium-containing oxide nanoparticles have many current industrial uses, along with many emerging technical applications. They are well known as important components, for example, in three-way automotive exhaust catalysts, automotive fuel borne catalysts, water gas shift reaction catalysts, polishing and planarization agents, solid oxide fuel cells, hybrid solar cells and ultra-violet sun blockers. There are many synthetic processes for the production of metal oxides, including aqueous and hydrothermal precipitation, spray precipitation, combustion, plasma deposition and electrochemical techniques, among others. While water may be utilized as a solvent in each of these synthetic processes, aqueous reaction chemistries are particularly favored in manufacturing processes where high material through-put is desired. However, conventional aqueous processes—precipitation in particular—are costly as they involve multiple steps that are often time and energy consuming, as well as equipment intensive.

Conventional large-scale metal oxide manufacturing processes can typically be divided into three stages: aqueous precipitation of precursor compounds, calcination to promote chemical reaction and to enhance crystallinity, followed by final particle size adjustment. In more detail, aqueous precipitation includes the initial steps of reactant dispersal, reactant delivery, particle precipitation, isolation, washing, drying, and optional impregnation with other metal ions; calcination involves heating to 400-1000° C. for several hours; followed by grinding, milling or classification to adjust the final particle size, among other steps.

One approach to reduce the number of steps in the aqueous precipitation stage is to employ methods that produce a stable aqueous dispersion (suspension) of the final particles directly from the initial reactants, thereby avoiding the time, cost and potential contamination inherent in the particle precipitation, isolation, and drying steps. Moreover, if the particles produced in such a direct method are sufficiently pure, wherein the chemical composition of the particles is as desired, and the particles are sufficiently crystalline, then the calcination step may also be eliminated. In addition, if the particle size and size distribution produced by such a direct method are substantially as desired, then the grinding, milling and classification steps may also be eliminated. Direct methods to produce aqueous dispersions (suspensions) of crystalline cerium-containing nanoparticles without the use of precipitation, isolation, drying, calcination, grinding, milling or classification steps, and the like, are described in commonly assigned U.S. Provisional Patent Application Ser. No. 12/779,602, CERIUM-CONTAINING NANOPARTICLES, filed May 13, 2010 by A. G. DiFrancesco et al., wherein stable aqueous dispersions of crystalline cerium-containing nanoparticles in a size range, for example, of 1-5 nanometers are described.

While substantial progress has been made in eliminating manufacturing steps from the synthetic process by which stable aqueous dispersions of metal oxide nanoparticles are prepared, use of these nanoparticles in applications such as fuel-borne combustion catalysts requires that dispersions of these nanoparticles also exhibit stability in the fuel, such that the nanoparticles remain suspended and do not settle out. Thus, these particles, although readily formed and suspended in a highly polar aqueous phase, must then be transferred to a substantially non-polar phase, a process known as solvent shifting. This problem is conventionally addressed by the use of particle stabilizers. However, most particle stabilizers used to prevent particle agglomeration in an aqueous environment are ill-suited to the task of stabilization in a non-polar environment. When placed in a non-polar solvent, such particles tend to immediately agglomerate and, consequently, lose some, if not all, of their desirable particulate properties. Changing stabilizers can involve a difficult displacement reaction or separate, tedious isolation and re-dispersal methods such as, for example, precipitation and subsequent re-dispersal with a new stabilizer using, for instance, a ball milling process, which can take several days and tends to produce polydisperse size frequency distributions.

One approach to simplify the solvent shifting process employs diafiltration methods and glycol ether solvents of a polarity intermediate between that of water and those of non-polar hydrocarbons, which are used to reduce the polarity of a cerium-containing nanoparticle dispersion, as disclosed in commonly assigned U.S. patent application Ser. No. 12/549,776, PROCESS FOR SOLVENT SHIFTING A NANOPARTICLE DISPERSION, filed Aug. 28, 2009. Diafiltration, sometimes referred to as cross-flow microfiltration, is a tangential flow filtration method that employs a bulk solvent flow tangential to a semi-permeable membrane. However, drawbacks of diafiltration methods include the following: relatively slow filtration rates (i.e. time consuming), substantial financial investment in equipment (e.g. pumps and microfilters), and production of a relatively large amount (e.g. several turnover volumes) of waste solvent.

To date, some progress has been achieved in reducing the cost of producing, and solvent shifting, aqueous dispersions of cerium-containing nanoparticles. However, further improvements in manufacturing efficiency are desired, particularly in the case of nanoparticle dispersions used as fuel-borne combustion catalysts that require dispersion stability in either a non-polar solvent carrier or in the fuel.

SUMMARY OF THE INVENTION

Described herein are methods for producing cerium-containing nanoparticles in non-polar solvents. Among other things, the instant methods afford production of cerium-containing nanoparticles in a non-polar solvent, thereby eliminating the need for a solvent shifting step. Thus, the methods permit more facile, rapid, and cost-effective manufacturing of cerium-containing nanoparticles that eliminate solvent shifting steps while retaining efficient yield.

In one embodiment, a method of making a metal-oxide nanoparticle comprises: (a) forming a reaction mixture of a source of cerous ion and a carboxyilic acid, and optionally, a hydrocarbon solvent; and optionally further comprises a non-cerous metal ion; (b) heating the reaction mixture to oxidize cerous ion to ceric ion; and (c) recovering a nanoparticle of either cerium oxide or a mixed metal oxide comprising cerium. As contemplated, the reaction conditions are such that the reaction can be run neat in a carboxylic acid, or in a solvent mixture further comprising a hydrocarbon. As used herein, the term "a carboxylic acid" includes a mixture of carboxylic acids; and the term "a hydrocarbon" includes mixtures of hydrocarbons.

Also provided is a process for preparing a dispersion of cerium-containing oxide nanoparticles, optionally containing one or more metal ions (M) other than cerium, comprising: (a) forming a reaction mixture comprising a source of cerous ion and, optionally a source of one or more metal ions (M) other than cerium, and a carboxylic acid; and, optionally, a hydrocarbon solvent; and (b) providing temperature conditions effective to oxidize cerous ion to eerie ion. The reaction forms a product dispersion comprising nanoparticles of cerium oxide, $CeO_{2-\delta}$, or a mixed metal oxide, $Ce_{1-x}M_xO_{2-\delta}$, wherein "x" has a value from about 0.001 to about 0.95, and $\delta$ has a value from about 0.0 to about 0.5.

The reaction conditions disclosed herein facilitate the formation of cerium-containing metal oxide nanoparticles having cubic fluorite crystal structure and geometric diameter in the range of about 1 nanometer to about 20 nanometers.

In some embodiments, the carboxylic acid acting as the solvent (neat), or in the solvent mixture, is methoxyacetic acid, octanoic acid, or oleic acid. In some embodiments, the hydrocarbon used as the solvent, or in the solvent mixture, is octadecene or an isoparaffinic oil.

In some embodiments, the non-cerous metal ion, M, is iron, zirconium, or combinations thereof.

DETAILED DESCRIPTION OF THE INVENTION

Figure 1:
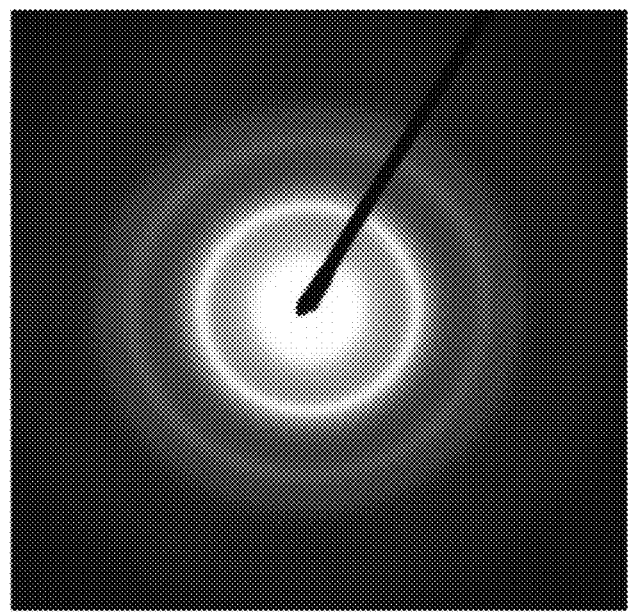
FIG. 1 is an electron diffraction image of $CeO_2$ nanoparticles prepared in octanoic acid as described in Example 1.

It is to be understood that elements not specifically shown or described may take various forms well known to those skilled in the art. The invention is defined by the claims.

References in the specification to "one embodiment", "an embodiment", "a particular embodiment", "a specific embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this application, the term "metal" is understood to encompass chemical elements of the Periodic Table other than those of the following atomic numbers: 1-2, 5-10, 14-18, 33-36, 52-54, 85 and 86.

In this application, the term "transition metal" is understood to encompass the 29 chemical elements 21 to 30, 39 to 48, 72 to 80, which are included in Periods 4, 5, 6, respectively, of the Periodic Table.

In this application, the term "rare earth metal" is understood to encompass the 15 chemical elements of atomic number 57 to 71, which are included in Period 5 of the Periodic Table.

Nanoparticles are particles having a mean diameter of less than about 100 nanometers (nm). The size of the resulting cerium-containing oxide particles may be determined by dynamic light scattering, a measurement technique for determining the hydrodynamic diameter of the particles. The hydrodynamic diameter is typically slightly larger than the geometric diameter of the particle because it includes both the native geometric particle size and the solvation shell surrounding the particle. When a beam of light passes through a colloidal dispersion, the particles or droplets scatter some of the light in all directions. When the particles are very small compared with the wavelength of the light, the intensity of the scattered light is uniform in all directions (Rayleigh scattering). If the light is coherent and monochromatic as, for example, from a laser, it is possible to observe time-dependent fluctuations in the scattered intensity, using a suitable detector such as a photomultiplier capable of operating in photon counting mode. These fluctuations arise from the fact that the particles are small enough to undergo random thermal Brownian motion, and the distance between them is therefore constantly varying. Constructive and destructive interference of light scattered by neighboring particles within the illuminated zone gives rise to the intensity fluctuation at the detector plane, which, because it arises from particle motion, contains information about this motion. Analysis of the time dependence of the intensity fluctuation can therefore yield the diffusion coefficient of the particles from which, via the Stokes Einstein equation and the known viscosity of the medium, the hydrodynamic radius or diameter of the particles can be calculated. Alternatively, the geometric diameter of a nanoparticle may be determined by analysis of transmission electron microscopy (TEM) images or by peak width analysis of a power X-ray diffraction (XRD) spectrum.

Although nominally described as "cerium oxide" or "cerium dioxide", it will be understood by one skilled in the chemical arts, that the actual oxidic anions present may comprise oxide anions or hydroxide anions, or mixtures thereof, such as hydrated oxide phases (e.g. oxyhydroxide). In addition, compositions of matter comprising solid solutions of multivalent cations are often termed non-stoichiometric solids. Thus, for oxide phases comprised of metal cations of multiple oxidation states, it is understood that the total amount of oxidic anions present will be determined by the specific amounts of the various oxidation states of the metal cations present (e.g. $Ce^{3+}$ and $Ce^{4+}$), such that charge neutrality is maintained. In general, as used herein, the term "cerium oxide" or "metal oxide" contemplates those various oxidation states, and thus is not restricted to a singular oxide form. For non-stoichiometric phases nominally described as metal dioxides, this is embodied in the chemical formula $MO_{2-\delta}$, wherein the value of δ (delta) may vary. For cerium oxides, $CeO_{2-\delta}$, the value of δ (delta) typically ranges from about 0.0 to about 0.5, the former denoting cerium (IV) oxide, $CeO_2$, the latter denoting cerium (III) oxide, $CeO_{1.5}$ (alternatively denoted $Ce_2O_3$).

The term "doped" particle refers to a particle containing one or more foreign or dopant ions present in concentrations greater than would normally be present as impurities. Generally, and as used herein, a dopant is present in concentrations ranging from about 0.1 percent to about 95 percent, and may be of either a substitutional or non-substitutional nature. Above 50% doping, the roles of host and guest ions become transposed. Doping of cerium oxide with a metal ion may be described in general by the formula $Ce_{1-x}M_xO_{2-\delta}$, wherein x varies from about 0.001 to about 0.95, and δ varies from about 0.0 to about 0.5 in order to maintain charge neutrality. It is understood that the value of δ may be less than zero for metal dopant ions with a formal valence state greater than 4+. Combinations of dopant metals are also considered. In particular embodiments, the transition metals are iron and zirconium. Some alternative terms commonly used in place of "doped" are "substituted", "mixed metal" and "lattice engineered."

One method of preparing a cerium-containing metal oxide nanoparticle, optionally containing one or more metal ions (M) other than cerium, comprises: (a) forming a reaction mixture of cerous ion and a solvent, wherein the solvent consists of, or consists essentially of, a carboxylic acid (or mixture of carboxylic acids) and an optional hydrocarbon (or mixture of hydrocarbons); and optionally further comprising a non-cerous metal ion; (b) heating the reaction mixture; and, (c) recovering a nanoparticle of either cerium oxide or a mixed metal oxide comprising cerium.

In another embodiment, the method comprises: a) forming a reaction mixture of a source of cerous ion and a solvent, and optionally further comprising a non-cerous metal ion, wherein the solvent consists essentially of: (1) a carboxylic acid, and (2) an optional hydrocarbon; b) heating the reaction mixture; and, c) recovering a cerium-containing metal oxide nanoparticle.

Another process of preparing a dispersion of cerium-containing metal oxide nanoparticle, optionally containing one or more metal ions (M) other than cerium, comprises: (a) forming a reaction mixture comprising a source of cerous ion and, optionally a source of one or more metal ions (M) other than cerium, and a carboxylic acid; and optionally a hydrocarbon solvent, and (b) providing temperature conditions effective to enable oxidation of cerous ion to eerie ion, thereby forming a product dispersion comprising nanoparticles of cerium oxide, $CeO_{2-\delta}$, or a mixed metal oxide, $Ce_{1-x}M_xO_{2-\delta}$, wherein "x" has a value from about 0.001 to about 0.95, and δ has a value from about 0.0 to about 0.5.

In the foregoing reaction conditions, the reaction mixture may also consist of, or consist essentially of, a neat carboxylic acid, or mixture of acids, as the solvent; or the solvent medium might further include a hydrocarbon or mixture of hydrocarbons. Thus, the solvent medium might consist essentially of, or consist of, a carboxylic acid (or mixture of carboxylic acids), and, optionally, a hydrocarbon solvent (or mixture of hydrocarbons).

The cerium oxide nanoparticles obtained may be configured to have a cubic fluorite crystal structure and a geometric diameter in the range of about 1 nanometer to about 20 nanometers.

Any source of cerous ion may be used in the methods described herein. In some embodiments, the source of cerous ion is cerous acetate hydrate or cerous nitrate hexahydrate. The source of iron ions is likewise diverse. In some embodiments it is ferric acetate, alternatively known as basic iron acetate, iron(III) acetate, or ferric oxyacetate, with the formula ($[Fe_3(\mu^3-O)(OAc)_6 \cdot 3H_2O]OAc$), wherein OAc is $CH_3CO_2^-$. Alternative or additional sources of iron ion include ferric nitrate nonahydrate and iron oxyhydroxide (FeOOH).

Without being bound by any theory, the carboxylic acid surfactant may surface functionalize the product nanoparticles. In various embodiments, the carboxylic acid surfactant is a carboxylic acid with carbon chain length of about 3-22, although longer chain length acids may also be useful. In various embodiments, the carboxylic acid surfactant is selected from the group consisting of propionic acid, butanoic acid, pentanoic acid, hexanoic acid, heptanoic acid, 2-ethylhexanoic acid, octanoic acid, nonanoic acid, decanoic acid, undecanoic acid, dodecanoic acid, tetradecanoic acid, and arachidic acid, and combinations thereof. In other embodiments, the carboxylic acid surfactant is selected from oleic acid, linoleic acid, stearic acid, and palmitic acid, and combinations thereof. In still other embodiments, the carboxylic acid surfactants include monoether carboxylic acids, such as methoxyacetic acid (MAA); and polyether carboxylic acids, such as 2-(2-methoxyethoxy)acetic acid (MEA) and 2-[2-(2-methoxyethoxy)ethoxy]acetic acid (MEEA). In still other embodiments, the carboxylic acid surfactant is a dicarboxylic or tricarboxylic acid.

In additional embodiments, the reaction mixture further comprises a hydrocarbon solvent. In particular embodiments, a hydrocarbon solvent with a boiling point greater than the boiling point of waters of hydration or of anions such as acetate or nitrate in the reaction mixture, is selected to enhance the removal (i.e. fractional distillation) of the water or anions from the product dispersion. In specific embodiments, the hydrocarbon solvents are straight chain, branched or cyclic $C_5$-$C_{25}$ paraffins, isoparaffin distillates (e.g. ISOPAR™), hydrotreated petroleum distillates (e.g. KENSOL® 48H, KENSOL® 50H), and the like, or olefins, such as 1-octadecene.

In these reaction mixtures, cerous ion reacts to form ceric ion, which is converted to crystalline cerium oxide. The rate of formation of those metal oxides (e.g., cerium dioxide) can be increased with addition of heat. Thus, in various embodiments, the reaction mixture is heated. In particular embodiments, the reaction mixture is heated above about 100° C.; and, in other embodiments, the temperature is adjusted to or maintained from about 100° C. up to about 250° C. Time and temperature can be traded off; and higher temperatures will generally increase rate of reaction and reduce the time required for formation of the product metal oxide. After a period of time, (e.g., about 1-2 hours at elevated temperature), the cerous ion converts to crystalline nanoparticulate cerium oxide (or mixed metal oxide). Heat may then be removed, and the reaction mixture may then be allowed to cool, e.g., to about 15-25° C. The product metal oxide nanoparticles can then be concentrated and/or collected; and/or the unreacted cerium and waste by-products may be removed, for example, by solvent extraction.

In various embodiments, mixers are used to agitate and mix the reactants.

In a particular embodiment, the product nanoparticles of mixed metal oxides comprise nanoparticles containing cerium as a major metal ion component (i.e., >50% wt of the nanoparticle), and one or more metal ions other than cerium as minor metal ion components (i.e., each, respectively, <50% wt of the nanoparticle). In another embodiment, the product nanoparticles of mixed metal oxides comprise nanoparticles containing cerium as a minor metal ion component and one or more metal ions other than cerium as a major metal ion component. In another embodiment, the product nanoparticles of mixed metal oxides comprise nanoparticles containing cerium and at least two metal ions other than cerium, wherein each is present as a minor metal ion component. The term "minor metal ion component" is used herein to mean a metal oxide portion of the nanoparticle constituting less than half the constituent metal oxide of the nanoparticle by weight.

In other embodiments, the product nanoparticles of mixed metal oxides comprise composite particles wherein the amount of cerium metal ion varies from region to region within the particle. In a specific embodiment, the product composite nanoparticles of mixed metal oxides comprise regions wherein cerium is a major metal ion component along with regions wherein cerium is a minor metal ion component. In another specific embodiment, the product composite nanoparticles of mixed metal oxides comprise two or more regions wherein cerium is a major metal ion component but of differing amounts. In still another specific embodiment, the product composite nanoparticles of mixed metal oxides comprise two or more regions wherein cerium is a minor metal ion component but of differing amounts.

In various embodiments, the product dispersion contains minimal water, e.g., less than about 0.5 wt. %, less than about 0.05 wt. %, less than about 0.005 wt. %, less than about 0.0005 wt. %, or less than about 0.00005 wt. %.

In various embodiments, the concentration of the product cerium-containing nanoparticles dispersions is greater than about 0.5 molal, greater than about 1.0 molal, or greater than about 2.0 molal (approximately 35% solids in the dispersion).

While not wishing to be bound by any theory, the source of the oxide ion in the product cerium-containing oxide nanoparticles may originate from waters of hydration associated with the source metal ion salts, from oxygen containing anions such as acetate or nitrate associated with the source metal ions, from the carboxylic acid surfactant, or from molecular oxygen. In one embodiment, molecular oxygen is passed over and/or through the reaction mixture.

Herein a material is said to be crystalline if it is able to produce a diffraction pattern upon irradiation by a beam of either electrons or X-rays, otherwise it is deemed to be amorphous. In particular embodiments, the cerium-containing nanoparticles exhibit cubic fluorite crystal structure. The term single crystallite particle refers to particles that are not composed of multiple, agglomerated crystallites of various sizes, but rather a single crystal of well defined dimensions dictated by the number of constituent unit cells. In particular embodiments, the single crystallite particles contain about two unit cells per edge for 1.1 nm particles, or up to about 5 unit cells per edge for 2.7 nm particles.

In other embodiments, the transition metal-containing cerium oxide nanoparticles have a geometric diameter less than about 4, or less than about 2 nm. In various embodiments of the invention, the product dispersion of cerium-containing nanoparticles is combined with an organic diluent that comprises one or more glycol ethers. The organic diluent may further include an alcohol. In a particular embodiment, the diluent comprises diethylene glycol monomethyl ether or 1-methoxy-2-propanol, or a mixture thereof. In other embodiments, the product dispersion of cerium-containing nanoparticles is combined with an organic diluent that comprises polyisobutylene succinic anhydride (PIBSA).

In other embodiments, the product dispersion of cerium-containing nanoparticles is further mixed with a hydrocarbon diluent selected from among hydrocarbons containing about 5-22 carbon atoms, for example, octane, decane, kerosene, toluene, naphtha, diesel fuel, biodiesel, isoparaffin distillates (e.g. ISOPAR™), hydrotreated petroleum distillates (e.g. KENSOL® 48H, KENSOL® 50H), and mixtures thereof, to form a homogeneous dispersion. The homogeneous dispersion may further include a co-surfactant, such as an alcohol. When used as a fuel additive, one part of the homogeneous dispersion is combined with at least about 100 parts of the fuel.

The invention is further illustrated by the following examples, which are not intended to limit the invention in any manner.

EXAMPLES

Example 1

Ceria Nanoparticles Prepared in Octanoic Acid at 220° C.

A 50 cc beaker was charged with 9.00 g octanoic acid. Then 3.00 g cerium(III) acetate hydrate $((CH_3CO_2)_3Ce \cdot xH_2O)$ powder (7.15:1 molar ratio of octanoic acid:cerium) was added at room temperature. The mixture was stirred with no apparent reaction, so the beaker was heated on a hot plate. As the temperature within the beaker neared about 100° C., the color of the mixture turned to a light yellow. Upon further heating, acetic acid (bp 118° C.) and $H_2O$ vapor appeared to boil off. The reaction mixture was eventually ramped to 220° C. over a period of 1 hr, during which the yellow color became much deeper, nearly amber. Upon cooling the reaction product became viscous, although substantially less viscous than the reaction product of Example 4 described below, wherein oleic acid was used as the solvent.

A spot of the viscous reaction product was diluted in toluene and dried down onto a TEM grid. Subsequently the grid was soaked in a bath of toluene in an attempt to remove the octanoic acid. An Electron Diffraction pattern was successfully recorded, as shown in FIG. 1, wherein the brightest ring corresponds to the (111) lattice plane of crystalline $CeO_2$.

A solvent of isoparaffin distillates (ISOPAR™-G) was added to a sample of the viscous reaction product, which quickly dissolved; however a faint turbidity and a wisp of flocculated particles was observed after a few minutes. On the next day a precipitate was observed on the bottom of the bottle.

Figure 2:
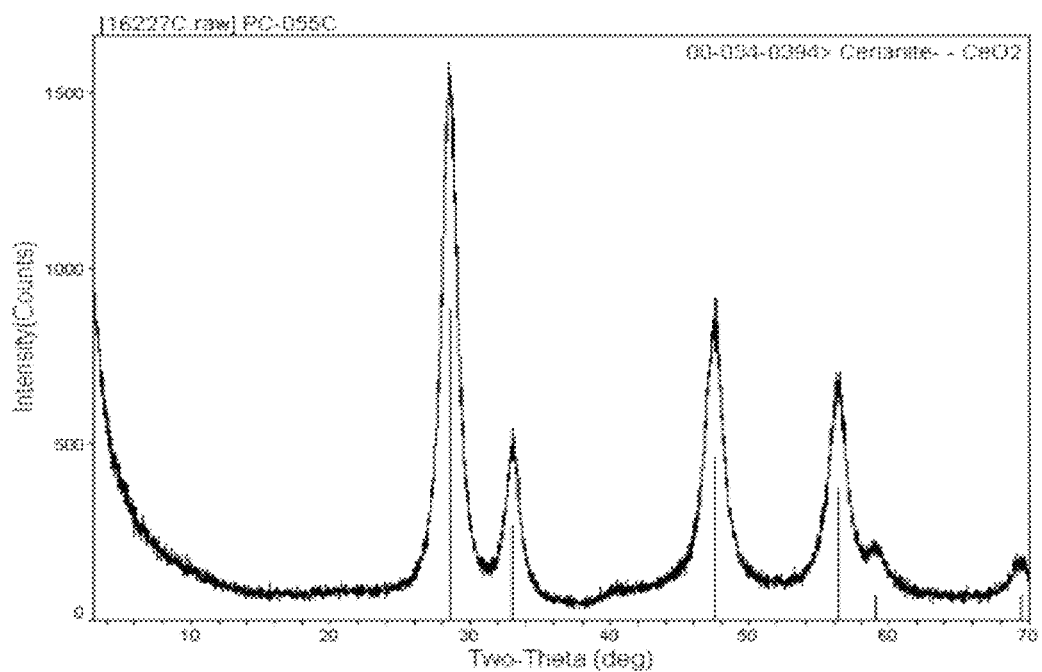
FIG. 2 is a powder X-ray diffraction (XRD) pattern of $CeO_2$ nanoparticles prepared in octanoic acid as described in Example 1, along with the corresponding X-ray line spectrum of $CeO_2$ (PDF No. 34-394, cerianite).

In an attempt to isolate cerium containing nanoparticles from the viscous reaction product, a vacuum distillation process was employed to remove some of the octanoic acid. A 100 cc round-bottom flask was fitted with a thermometer, a vacuum take-off and a mini magnetic stir bar. The flask was connected to a vacuum pump through a trap cooled with a dry ice/acetone bath. The octanoic acid boiled off vigorously from the viscous reaction product when the pump was turned on with the temperature at about 100° C. The remaining reaction product became very viscous after removal of about 6 ml of octanoic acid, resulting in an amber gel. A portion of the amber gel was dissolved in isoparaffin distillate (ISOPAR™-G) with heating to give a clear amber solution. Another portion of the amber gel was removed from the flask and placed into an alumina pan and heated in a muffle furnace to 240° C., thereby forming a black mass, which was then heated at 250° C. for 1 hr to give a yellow powder. A sample of the resulting yellow powder was characterized by powder X-ray diffraction (XRD) analysis, as shown in FIG. 2, revealing that it was essentially pure crystalline $CeO_2$ with an average grain size of 5.7 nm as determined using the peak width at half height of the (220) reflection and the Scherrer equation.

Example 2

Nanoparticles Prepared in 2× Octanoic Acid and 1-Octadecene Solvent

A 100 cc round-bottom flask was charged with 18.0 g octanoic Acid, 550 g 1-octadecene and a magnetic stir bar. Then 3.00 g cerium(III) acetate hydrate (($CH_3CO_2)_3$Ce·x$H_2O$) powder (14.3:1 molar ratio of octanoic acid:cerium) was added at room temperature. The clear mixture was stirred with no apparent reaction, so the beaker was heated using a heating mantle. As the temperature within the beaker neared about 100° C., the color of the mixture turned to a light yellow. All solids were dissolved. The temperature of the reaction mixture was ramped to 200° C. over a 1 hr. period, and then held there for 2 hr. During this final heating, the reaction mixture deepened to an amber/brown color.

ISOPAR™-G was added to a sample of the reaction mixture, which fully dissolved. This dispersion showed no evidence of any precipitate when examined on the next day. Thus, this preparation resulted in a more stable dispersion in a non-polar carrier (i.e. isoparaffin distillates, commercially available as ISOPAR™-G) than did the preparation used to form the viscous reaction product of $CeO_2$ described in Example 1 above.

Examples 3-5

Using a Higher-Boiling Unsaturated Carboxlic Acid, Oleic Acid

Example 3

Nanoparticles Prepared in Oleic Acid

A 100 cc beaker was charged with 18.00 g oleic acid. Then 6.00 g cerium(III) acetate hydrate (($CH_3CO_2)_3$Ce·x$H_2O$) powder (3.65:1 molar ratio of oleic:cerium) was added at room temperature. The mixture was stirred with no apparent reaction, so the beaker was heated on a hot plate. As the temperature within the beaker neared about 100° C., the color of the mixture turned to a light yellow. Upon further heating, acetic acid (bp 118° C.) and $H_2O$ vapor appeared to boil off. The reaction mixture was eventually heated for about 1 hr at 150° C. and the yellow color became much deeper, nearly amber, and the product became very viscous. At this point all of the original white ($CH_3CO_2)_3$Ce·x$H_2O$ powder had disappeared.

Characterization of the particle size of a toluene dispersion of the viscous reaction product was attempted by dynamic light scattering using a Brookhaven 90Plus Particle Size Analyzer (Brookhaven Instruments Corp., Holtzville, N.Y., U.S.A.) equipped with a quartz cuvette. However, a stable signal was not attained, suggestive that perhaps the particle size of the fully dispersed sample was below the detection threshold (~2 nm) of the Brookhaven instrument.

Example 4

Nanoparticles Prepared in Oleic Acid at 240° C.

A 50 cc beaker was charged with 9.00 g oleic acid. Then 3.00 g cerium(III) acetate hydrate (($CH_3CO_2)_3$Ce·x$H_2O$) powder (3.65:1 molar ratio of oleic:cerium) was added at room temperature. The mixture was stirred with no apparent reaction, so the beaker was heated on a hot plate. As the temperature within the beaker neared about 100° C., the color of the mixture turned to a light yellow. Upon further heating, acetic acid (bp 118° C.) and $H_2O$ vapor appeared to boil off. The reaction mixture was eventually ramped to 240° C. over a period of 1 hr, during which the yellow color became much deeper, nearly black, and upon cooling became an extremely viscous tar.

Example 5

Nanoparticles Prepared in 2× Oleic Acid at 130° C.

The procedures of Example 4 were repeated except that the amount of oleic acid was doubled (7.3:1 molar ratio of oleic:cerium) in an attempt to alter the mean size of the nanoparticles. As the temperature within the beaker neared about 100° C., the color of the mixture turned to a light yellow. Upon further heating, acetic acid (bp 118° C.) and $H_2O$ vapor appeared to boil off. The reaction mixture was eventually heated for about 2 hr at 130° C. and the yellow color became much deeper, nearly amber, and the product became very viscous. At this point all of the original white ($CH_3CO_2)_3$Ce·x$H_2O$ powder had disappeared.

After cooling, a portion of the reaction product was completely dispersed in toluene solvent such that no additional material was present. This dispersion was observed to remain fully dispersed with no hint of agglomeration, nine months after preparation.

Characterization of the particle size of a toluene dispersion of the viscous reaction product was attempted by dynamic light scattering using a Brookhaven 90Plus Particle Size Analyzer (Brookhaven Instruments Corp., Holtzville, N.Y., U.S.A.) equipped with a quartz cuvette. However, the results were suggestive that perhaps the particle size of the fully dispersed sample was below the detection threshold (~2 nm) of the Brookhaven instrument.

Examples 6-8

Using Oleic Acid and Isoparaffin Distillate (ISOPAR™-G) Solvent

Example 6

Figure 3:
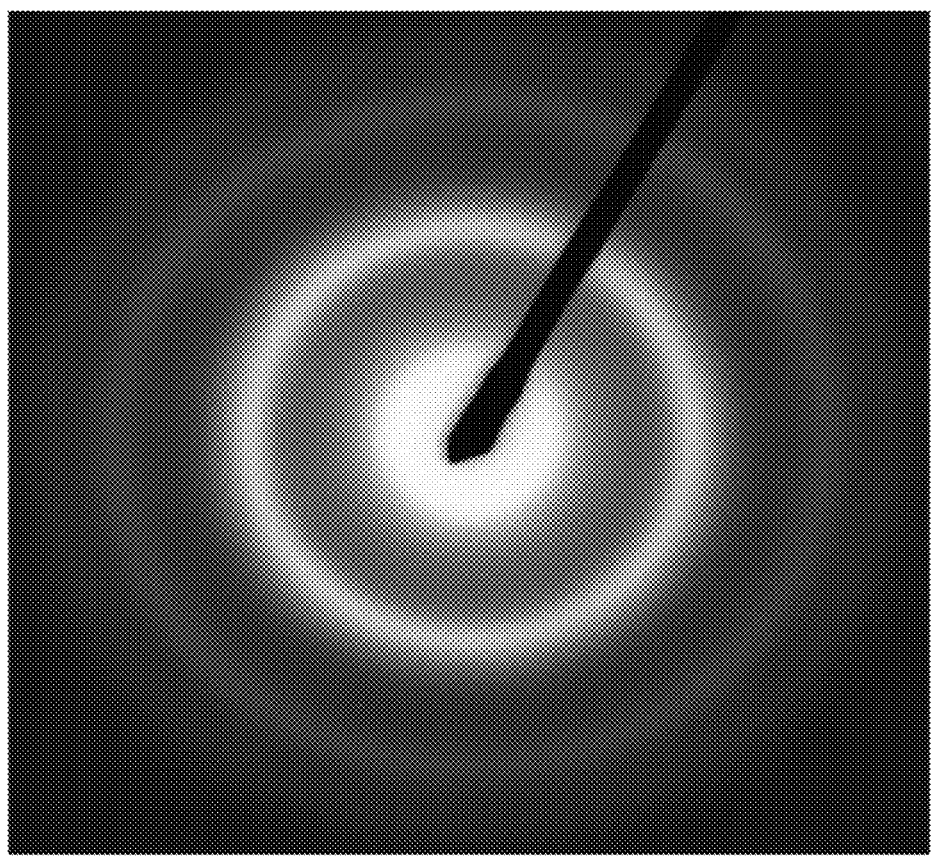
FIG. 3 is an electron diffraction image of $CeO_2$ nanoparticles prepared in oleic acid as described in Example 6.
Figure 4:
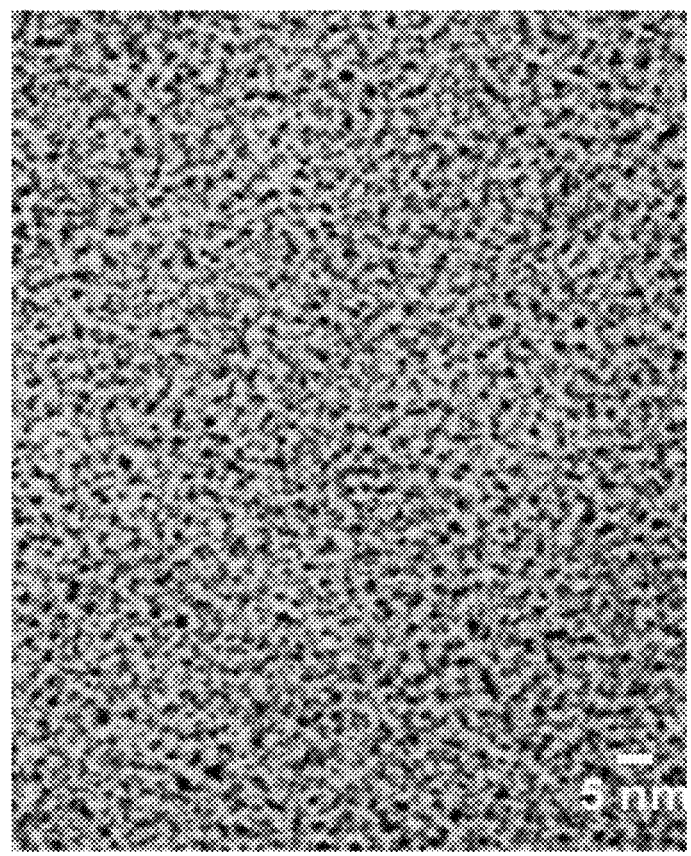
FIG. 4 is a transmission electron microscopy (TEM) image of cerium-containing nanoparticles prepared in a mixture of oleic acid and ISOPAR™-G solvent as described in Example 6.

A 100 mL beaker equipped with a 400° C. thermometer and a magnetic stirrer was charged with a mixture of 18.24 g oleic acid, 40 ml ISOPAR™-G and 5.99 g cerium(III) acetate hydrate (3.7:1 molar ratio of oleic:cerium) was heated under stirring in a fume hood while open to the air to 150° C., and kept at this temperature for one hour. Upon cooling an amber colored product reaction mixture was obtained. No sediment was observed, indicating that the reaction had proceeded to near completion. Crystallinity was assessed by electron diffraction as shown in FIG. 3, wherein the brightest ring had a d-spacing of 3.28 A, consistent with the most intense line of crystalline ceria [(111) planes], when lattice expansion at this small particle size is taken into account. Particle size was assessed by TEM as shown in FIG. 4, wherein a particle diameter of 1-2 nm is indicated.

Example 7

Nanoparticles Prepared in Oleic Acid and Isoparaffin Distillate (ISOPAR™-G) at 120° C.

Figure 5:
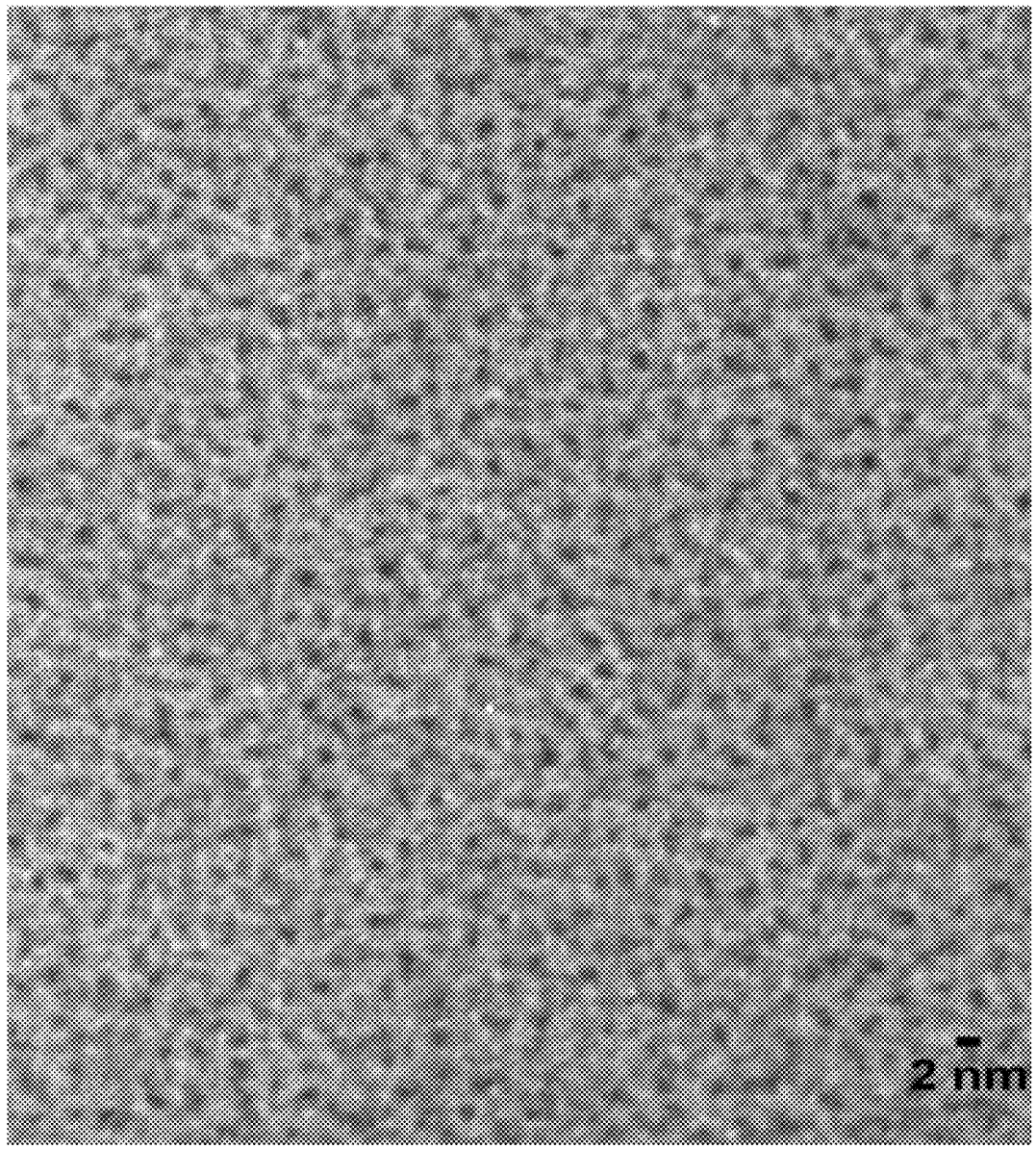
FIG. 5 is a TEM image of cerium-containing nanoparticles prepared in a mixture of oleic acid and ISOPAR™-G solvent as described in Example 7.

A 50 cc beaker was charged with 6.00 g oleic acid and 15 cc isoparaffin distillate (ISOPAR™-G). Then 2.00 g cerium (III) acetate hydrate (3.65:1 molar ratio of oleic:cerium) powder was added at room temperature. The mixture was stirred with no apparent reaction, so the beaker was heated on a hot plate. As the temperature within the beaker neared about 100° C., the color of the mixture turned to a light yellow. The reaction mixture was heated for about 1 hr at 120° C. and the yellow color became much deeper. Acetic acid (bp 118° C.) and $H_2O$ vapor appeared to boil off. At this time all the original white $(CH_3CO_2)_3Ce \cdot xH_2O$ powder had dissolved. The reaction mixture was cooled to room temperature and a sample examined by transmission electron microscopy, which revealed a particle size of 1-2 nm (diameter) with few larger agglomerates, as shown in FIG. 5.

Example 8

Figure 6:
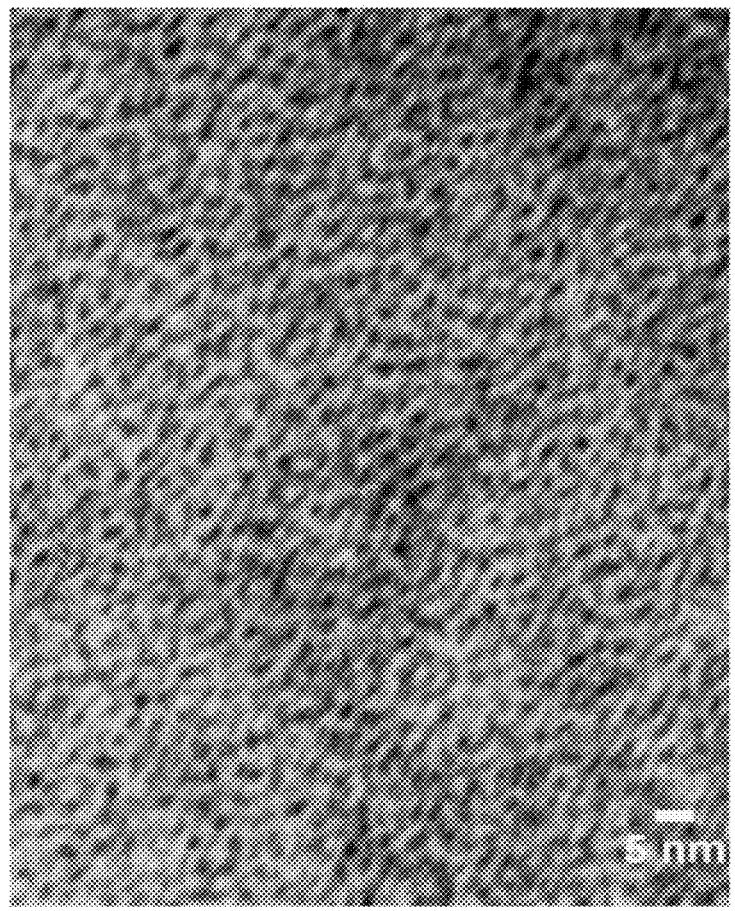
FIG. 6 is a TEM image of cerium-containing nanoparticles prepared in a mixture of oleic acid and ISOPAR™-G solvent as described in Example 8.

Nanoparticles Prepared in Oleic Acid and Isoparaffin Distillate (ISOPAR™-G) at 120° C. for 2 hr A 100 mL beaker equipped with a 400° C. thermometer and a magnetic stirrer was charged with a mixture of 18.01 g oleic acid, 40 ml isoparaffin distillate (ISOPAR™-G) and 6.02 g cerium(III) acetate hydrate (3.6:1 molar ratio of oleic: cerium) was heated under stirring in a fume hood while open to the air to 120° C., and kept at this temperature for two hours. Upon cooling a clear dark amber colored product reaction mixture was obtained. No sediment was observed, indicating that the reaction had proceeded to near completion. Particle size was assessed by TEM as shown in FIG. 6, wherein a particle diameter of 1-2 nm was indicated. Thus, substantially similar results were obtained when heating the reaction at 120° C. for 1 hour or for 2 hours.

Examples 9-10

Using Cerium Ions in a Combination of Oleic Acid and 1-Octadecene Solvent

Example 9

Nanoparticles Prepared in Oleic Acid and 1-Octadecene

Figure 7:
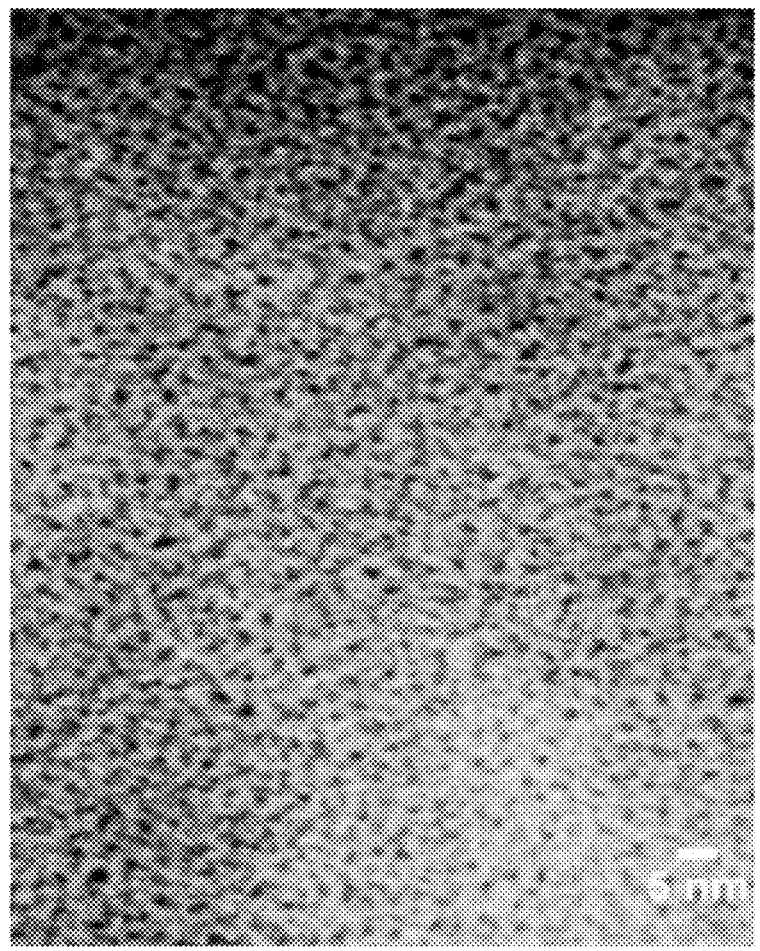
FIG. 7 is a TEM image of cerium-containing nanoparticles prepared in a mixture of oleic acid and 1-octadecene solvent as described in Example 9.

A 100 mL beaker equipped with a 400° C. thermometer and a magnetic stirrer was charged with a mixture of 10.38 g oleic acid, 25.01 g 1-octadecene and 2.98 g cerium(III) acetate hydrate (4.2:1 molar ratio of oleic:cerium) was heated under stirring in a fume hood while open to the air to 140° C., and kept at this temperature for one hour. Upon cooling a clear golden-yellow colored product reaction mixture was obtained. No sediment was observed, indicating that the reaction had proceeded to near completion. Particle size was assessed by TEM as shown in FIG. 7, wherein a particle diameter of 1-2 nm was indicated.

Example 10

Nanoparticles Prepared in Oleic Acid and 1-Octadecene

Figure 8:
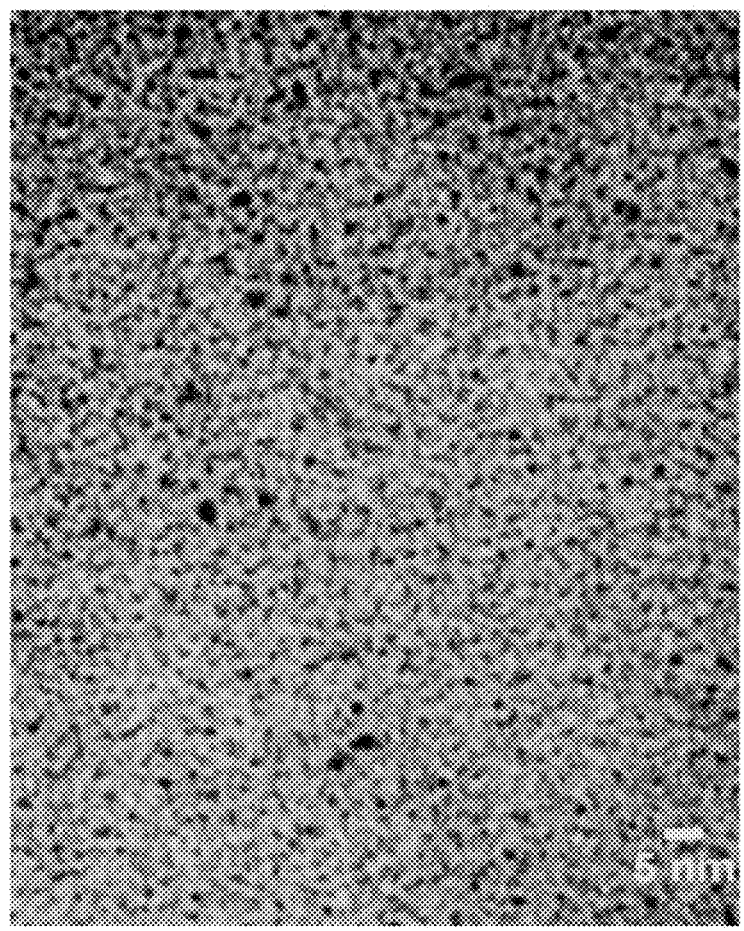
FIG. 8 is a TEM image of cerium-containing nanoparticles prepared in a mixture of oleic acid and 1-octadecene solvent as described in Example 10.

A 100 mL beaker equipped with a 400° C. thermometer and a magnetic stirrer was charged with a mixture of 13.22 g oleic acid, 14.82 g 1-octadecene and 2.00 g cerium(III) acetate hydrate (8:1 molar ratio of oleic:cerium) was heated under stirring in a fume hood while open to the air to 170° C., and kept at this temperature for one hour. Upon cooling a clear amber-copper colored product reaction mixture was obtained. No sediment was observed, indicating that the reaction had proceeded to near completion. Particle size was assessed by TEM as shown in FIG. 8, wherein a particle diameter of 1-2 nm was indicated.

Examples 11-17

Used a Mixture of Cerium and Iron Metal Ions in a Combination of Oleic Acid and 1-Octadecene Solvent

Example 11

Ce(0.98)Fe(0.02) Mixed Metal Nanoparticles

Figure 9:
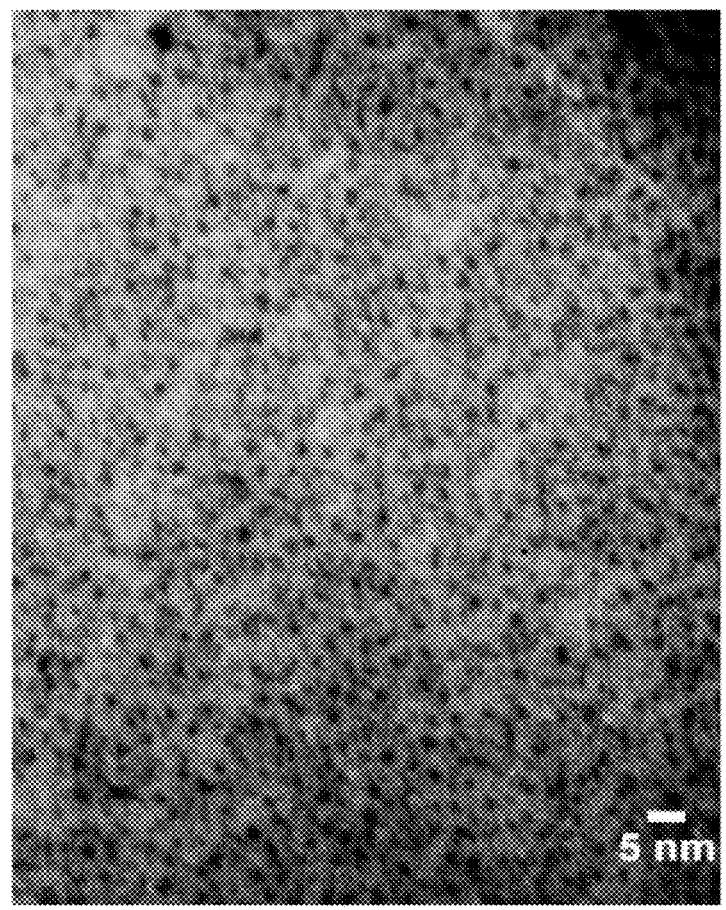
FIG. 9 is a TEM image of cerium and iron containing nanoparticles prepared in a mixture of oleic acid and 1-octadecene solvent as described in Example 11.

A 100 mL beaker equipped with a 400° C. thermometer and a magnetic stirrer was charged with a mixture of 13.23 g oleic acid (7.8:1 molar ratio of oleic:metals), 14.81 g 1-octadecene, 2.01 g cerium(III) acetate hydrate (98 mole % cerium) and 0.03 g Iron(III) acetate (2 mole % iron) was heated under stirring in a fume hood while open to the air to 170° C., and kept at this temperature for one hour. Upon cooling a clear amber-black colored product reaction mixture was obtained. No sediment was observed, indicating that the reaction had proceeded to near completion. Particle size was assessed by TEM as shown in FIG. 9, wherein, a particle diameter of 1-2 nm was indicated.

Example 12

Ce(0.94)Fe(0.06) Mixed Metal Nanoparticles

Figure 10:
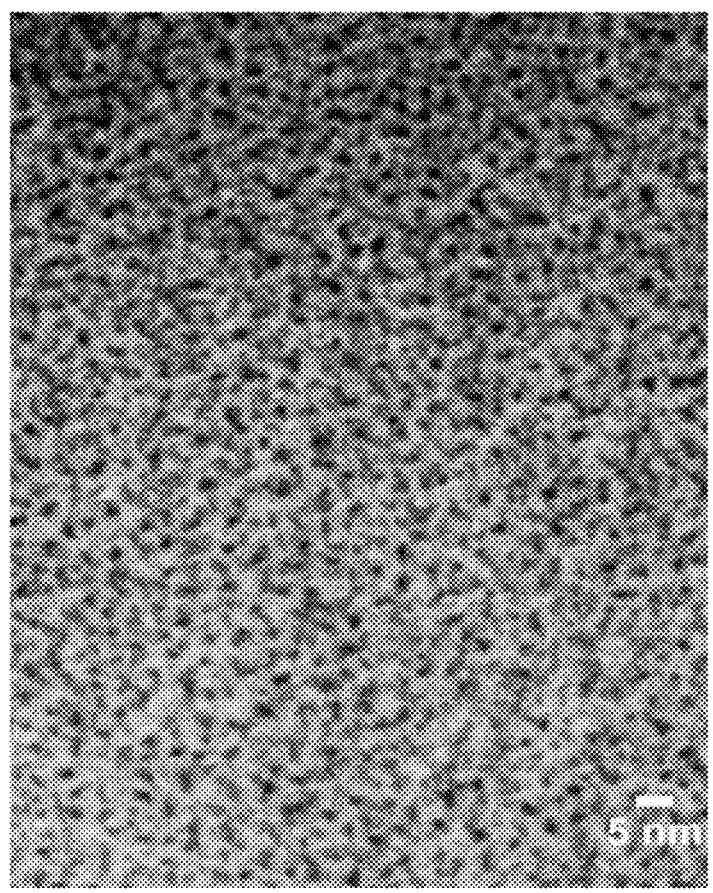
FIG. 10 is a TEM image of cerium and iron containing nanoparticles prepared in a mixture of oleic acid and 1-octadecene solvent as described in Example 12.

A 100 mL beaker equipped with a 400° C. thermometer and a magnetic stirrer was charged with a mixture of 25.02 g oleic acid (8.8:1 molar ratio of oleic:metals), 14.80 g 1-octadecene, 3.00 g cerium(III) acetate hydrate (94 mole % cerium) and 0.14 g Iron(III) acetate (6 mole % iron) was heated under stirring in a fume hood while open to the air, during which the solution gradually turned from a light brown suspension of sediment at 80° C., to dark brown at 138° C., and finally to a clear dark brown at 156° C. whereat all cerium and iron was dissolved. After further heating at 170° C. for one hour, cooling to room temperature yielded a clear brown-black colored product reaction mixture. No sediment was observed, indicating that the reaction had proceeded to near completion. Particle size was assessed by TEM as shown in FIG. 10, wherein a particle diameter of 1-2 nm was indicated.

Example 13

Ce(0.93)Fe(0.07) Mixed Metal Nanoparticles

A 100 mL beaker equipped with a 400° C. thermometer and a magnetic stirrer was charged with a mixture of 25.00 g oleic acid (9.3:1 molar ratio of oleic:metals), 14.81 g 1-octadecene, 3.00 g cerium(III) acetate hydrate (93 mole % cerium) and 0.15 g Iron(III) acetate (7 mole % iron) was heated under stirring in a fume hood while open to the air to 105° C., and kept at this temperature for one hour. The reaction began very slowly and bubbled during the entire hour, during which a gradual change in color and clearing of the suspension occurred. The temperature was then ramped to 170° C. for 30 minutes, during which the suspension initially bubbled, then became clear as all the solids reacted. After cooling to room temperature a clear amber-black colored product reaction mixture resulted. No sediment was observed, indicating that the reaction had proceeded to near completion. Particle size was assessed by TEM whereby a particle diameter of 1-2 nm was indicated.

Example 14

Ce(0.93)Fe(0.07) Mixed Metal Nanoparticles with Extended Heating

The clear amber-black reaction product of Example 13 was further heated to a temperature of 250° C. for 30 minutes. Upon cooling, a dark black, non-transparent and semi-viscous product reaction mixture was obtained. Particle size was assessed by TEM whereby a mean particle diameter of 2 nm was indicated along with some larger particles.

Example 15

Ce(0.86)Fe(0.14) Mixed Metal Particles

A 100 mL round bottom flask equipped with condenser, a 400° C. thermometer, a magnetic stirrer and heating mantle was charged with a mixture of 30.02 g oleic acid (5.2:1 molar ratio of oleic:metals), 14.82 g 1-octadecene, 6.02 g cerium (III) acetate hydrate (86 mole % cerium) and 0.6 g Iron(III) acetate (14 mole % iron) was heated under stirring and nitrogen gas to 300° C., and kept at this temperature for three hour. Upon cooling a dark brown colored product reaction mixture that became slightly thick was obtained.

Example 16

Ce(0.59)Fe(0.41) Mixed Metal Particles

A 100 mL round bottom flask equipped with condenser, a 400° C. thermometer, a magnetic stirrer and heating mantle was charged with a mixture of 8.59 g oleic acid (5.86:1 molar ratio of oleic:metals), 10.03 g 1-octadecene, 1.05 g cerium (III) acetate hydrate (59 mole % cerium) and 0.19 g iron oxyhydroxide (41 mole % iron) was heated under stirring and nitrogen gas to 300° C., and kept at this temperature for thirty minutes. Upon cooling a dark black colored product reaction mixture that became thick was obtained.

Example 17

Ce(0.70)Fe(0.30) Mixed Metal Particles

A 100 mL round bottom flask equipped with condenser, a 400° C. thermometer, a magnetic stirrer and heating mantle was charged with a mixture of 7.52 g oleic acid (3.06:1 molar ratio of oleic:metals), 10.02 g 1-octadecene, 2.10 g cerium (III) acetate hydrate (70 mole % cerium) and 0.23 g iron oxyhydroxide (30 mole % iron) was heated under stirring and nitrogen gas initially to 140° C. for 15 minutes, then to 300° C. for 15 minutes. Upon cooling a dark brown colored product reaction mixture was obtained.

Example 18

Nanoparticles Prepared in Methoxyacetic Acid

A 50 cc beaker was charged with 18.00 g methoxyacetic acid. Then 6.00 g cerium(III) acetate hydrate $((CH_3CO_2)_3Ce \cdot xH_2O)$ powder was added at room temperature. The mixture was stirred with no apparent reaction, so the beaker was heated on a hot plate. As the temperature within the beaker neared about 100° C., the color of the mixture turned to a very pale yellow. At this time all the original white $((CH_3CO_2)_3Ce \cdot xH_2O)$ had dissolved. Upon further heating, acetic acid (bp 118° C.) and $H_2O$ vapor appeared to boil off. The reaction mixture was eventually ramped to 190° C. and held at that temperature for a period of 1 hour, during which the pale yellow reaction mixture became very viscous.

What is claimed is:

1. A method of making a cerium-containing metal oxide nanoparticle, comprising:
    a) forming a reaction mixture of a source of cerous ion and a solvent, and optionally further comprising a non-cerous metal ion, wherein the solvent consists essentially of: (1) a carboxylic acid, wherein said carboxylic acid is a $C_3$-$C_{22}$ paraffinic carboxylic acid, a monoether carboxylic acid, a polyether carboxylic acid, or a mixture thereof, and (2) an optional hydrocarbon; and
    b) heating the reaction mixture to form a product dispersion containing cerium-containing metal oxide nanoparticles and less than about 0.5 wt. % water.

2. The method of claim 1, wherein said cerium-containing metal oxide nanoparticle is of cubic fluorite crystal structure and has a geometric diameter of about 1 nanometer to about 20 nanometers.

3. The method of claim 1, wherein said non-cerous metal ion is present in the reaction mixture, and said non-cerous metal ion is iron, zirconium, or a combination thereof.

4. The method of claim 1, wherein said carboxylic acid is a $C_3$-$C_{22}$ paraffinic carboxylic acid.

5. The method of claim 4, wherein said paraffinic carboxylic acid is octanoic acid.

6. The method of claim 1, wherein said carboxylic acid is a monoether carboxylic acid.

7. The method of claim 6, wherein said monoether carboxylic acid is methoxyacetic acid.

8. The method of claim 1, wherein said carboxylic acid is a polyether carboxylic acid.

9. The method of claim 8, wherein said polyether carboxylic acid is 2-(2-methoxyethoxy)acetic acid or 2-[2-(2-methoxyethoxy)ethoxy]acetic acid.

10. The method of claim 1, wherein said hydrocarbon solvent is present in the reaction mixture, and said hydrocarbon solvent is a $C_5$-$C_{25}$ paraffin, an olefin, an isoparaffin distillate, or a hydrotreated petroleum distillate.

11. The method of claim 10, wherein said paraffin is a straight chain, a branched or a cyclic paraffin.

12. The method of claim 10, wherein said olefin is 1-octadecene.

13. The method of claim 1, wherein the reaction mixture is heated from about 100° C. to about 250° C.

14. A method of making cerium-containing metal oxide nanoparticles, comprising:
    a) forming a reaction mixture comprising a source of cerous ion, an optional source of one or more non-cerous metal ions (M), and a solvent consisting essentially of a carboxylic acid and a hydrocarbon; and b) heating the reaction mixture to oxidize cerous ion to ceric ion, thereby forming a product dispersion comprising cerium-containing metal oxide nanoparticles, wherein the product dispersion comprises less than about 0.5 wt. % water.

15. The method of claim 14, wherein said non-cerous metal ion is iron and/or zirconium.

16. The method of claim 14, wherein said carboxylic acid is a $C_3$-$C_{22}$ paraffinic or olefinic carboxylic acid.

17. The method of claim 14, wherein said carboxylic acid is selected from the group consisting of: octanoic acid, oleic acid, methoxyacetic acid, 2-(2-methoxyethoxyl)acetic acid, 2-[2-(2-methoxyethoxyl)ethoxy]acetic acid, and mixtures thereof.

18. The method of claim 14, wherein said hydrocarbon solvent is a $C_5$-$C_{25}$ paraffin, an olefin, an isoparaffin distillate, or a hydrotreated petroleum distillate.

19. The method of claim 18, wherein said olefin is 1-octadecene.

20. The method of claim 1, wherein said cerium-containing metal oxide nanoparticles have a geometric diameter of less than about 2 nm.

21. The method of claim 14, wherein said cerium-containing metal oxide nanoparticles have a geometric diameter of less than about 2 nm.

* * * * *